HIGH SPEED IRON POWDER CLUTCH

Filed Aug. 18, 1953 4 Sheets-Sheet 1

*INVENTORS*
WALTER S. BUSLIK
EMIL M. VALEHRACH
*BY* P. C. Henninger

HIGH SPEED IRON POWDER CLUTCH

Filed Aug. 18, 1953 4 Sheets-Sheet 2

INVENTORS
WALTER S. BUSLIK
EMIL M. VALEHRACH
BY P. E. Henninger

Nov. 19, 1957 W. S. BUSLIK ET AL 2,813,605

HIGH SPEED IRON POWDER CLUTCH

Filed Aug. 18, 1953 4 Sheets-Sheet 3

INVENTORS
WALTER S. BUSLIK
EMIL M. VALEHRACH

BY P. E. Henninger

INVENTORS
WATER S. BUSLIK
EMIL M. VALEHRACH
BY P. E. Henninger

United States Patent Office 2,813,605

Patented Nov. 19, 1957

2,813,605

HIGH SPEED IRON POWDER CLUTCH

Walter S. Buslik, Poughkeepsie, and Emil M. Valehrach, Wappingers Falls, N. Y., assignors to International Business Machines Corporation, New York, N. Y., a corporation of New York Application August 18, 1953, Serial No. 375,000

4 Claims. (Cl. 192—21.5)

This invention relates to a high speed magnetic powder clutch and in particular to a clutch having an extremely high rate of acceleration and deceleration.

This invention was conceived as a means for intermittently rotating a capstan adapted to drive a magnetic tape through magnetic tape reading and writing heads at a speed of 200 inches per second. Such tapes are frequently more than 1200 feet in length and contain, or are adapted to receive, a great number of individual records, any one of which may be read or recorded during the intermittent movement of the tape through its reading and writing head. Since the drive clutch in such circumstances may be engaged and disengaged repeatedly between reading or recording operations upon a single tape, the rate at which the clutch will operate to accelerate the tape or bring it to a stop is of great importance. Iron powder clutches of known construction are not applicable in environments such as that described hereinabove because they do not have the required acceleration and deceleration speed due largely to the drag of the rotor on the iron powder through which the rotor operates. It is, therefore, the object of the present invention to reduce such drag and to provide a structure including an energizing magnet in which the current rises and drops very rapidly, whereby a clutch structure is made capable of driving an arrested magnetic tape to a speed of 200 inches in 5 to 7 milliseconds, and which will bring a running tape to a standstill in an equally short period of time. These and other objectives are attained by the illustrative structure specifically shown and described herein, the novel parts and combinations of which will become clear as the description unfolds.

In the drawings is illustrated a combination magnetic iron powder clutch and brake arrangement, and in these drawings Fig. 1 is an elevational view of the mechanism, parts thereof being shown in section in planes parallel to the axis;

Figures 11, 12:
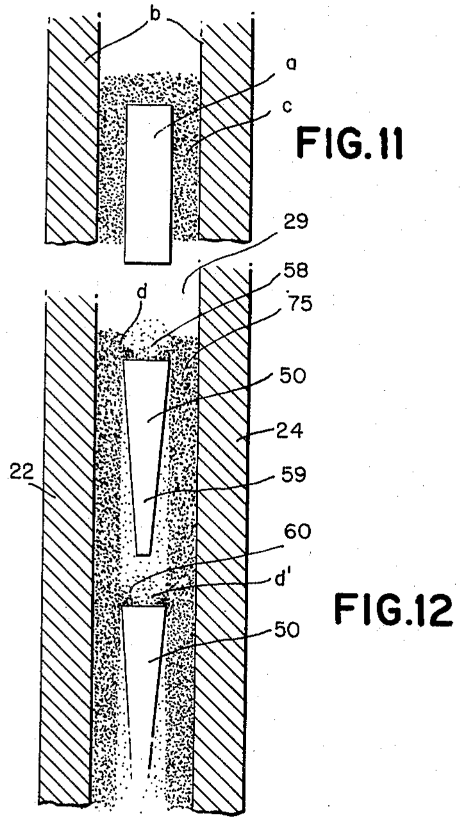

Fig. 11 is a diagrammatic view of a conventional rotor blade showing its effect on iron powder disposed between the opposite sides thereof and adjacent walls of a surrounding casing; and Fig. 12 is a diagrammatic view of a pair of rotor blades according to the present invention and adjacent walls of a surrounding casing to show the effect of the improved rotor blade herein on surrounding iron powder.

Figure 1:
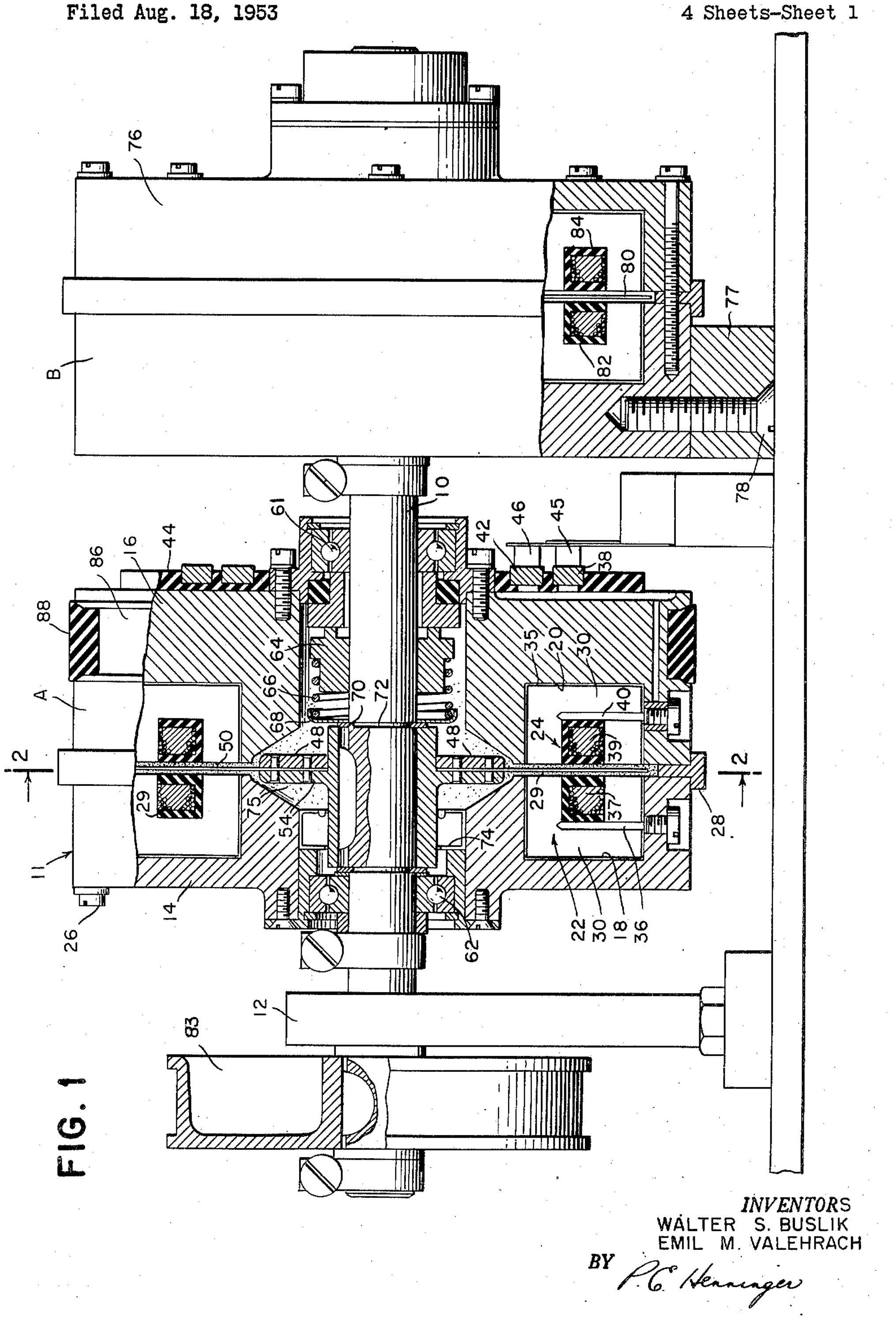

In Fig. 1 a drive clutch structure A is mounted for rotation on a shaft 10 which is rotatably mounted in suitable bearings in a bearing plate 12 and in the walls of a fixed brake clutch B. The drive clutch A includes a rotatable housing 11 consisting of two shells 14 and 16, which are formed to provide in each thereof circumferential grooves 18 and 20 which form chambers for magnetic lamination and coil assemblies 22 and 24. The shells 14 and 16 are united into a single casing structure by means of a plurality of screws 26, a flanged spacing ring 28 being interposed between the shells 14 and 16 to provide a rotor cavity 29 between the magnetic coil assemblies 22 and 24.

Figure 2:
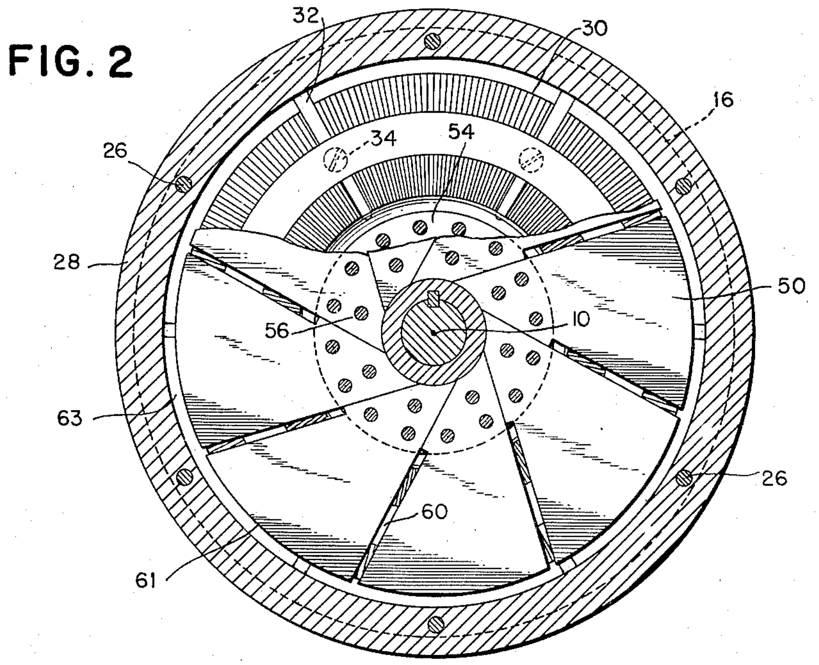
Fig. 2 is a sectional view on line 2—2 of Fig. 1, parts of the rotor vanes having been broken away to show underlying structure.
Figure 3:
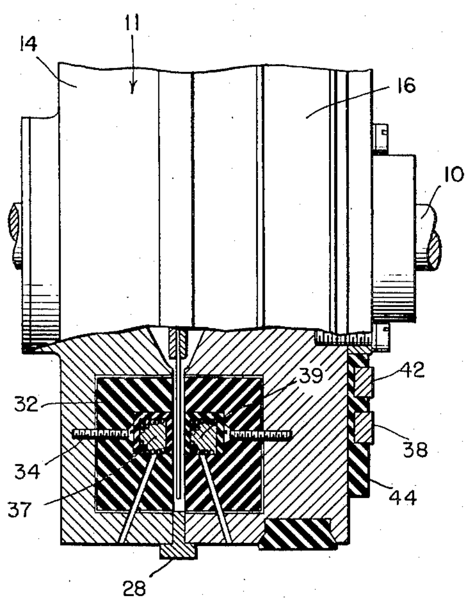
Fig. 3 is a fragmentary view of the drive clutch rotor with parts thereof broken away to show structure in a plane parallel to that of Fig. 1.

The nature of the magnetic coil assemblies 22 and 24 and their position in their respective shell elements 14 and 16 is best shown at the top of Fig. 2. The magnetic cores are composed of a plurality of separate steel laminations 30, which are separated into segments by means of lamination anchors 32 fixed to the respective clutch shells by means of screws 34. The laminated structure of the core serves to cut down eddy currents and improves the rise of current in the coil.

The laminations of the core are separated from direct contact with the shells by means of fish paper 35 cemented to the bottom and side walls of the grooves. The laminated core is assembled by forming the successive lamination segments of about 60 laminations each between the successive pairs of lamination anchors 32 between which the laminations are compressed. The individual laminations are preferably separated from each other by a thin layer of insulating cement.

Each of the laminations 30 and the lamination anchoring segments 32 are of U-shaped structure such that a circular groove is formed in the assembled core for respective coil rings 37 and 39. The coil 37 has a lead 36 through which the coil is connected to a commutator ring 38 while the coil 39 has a lead 40 by means of which it is connected to a commutator ring 42. The commutator rings 38 and 42 are carried by a disc 44 of insulating material affixed to a side wall of the shell 16. By means of commutator rings 38 and 42 and individually related brushes 45 and 46, the coils 37 and 39 are connected to a suitable current source.

Fixed to the shaft 10 at a point substantially midway between the shaft bearing points is a rotor 48 having blades 50 which extend into the rotor cavity 29 formed between the magnetic core and coil assemblies by means of the spacing ring 28.

The rotor 48 is characterized by the fact that it is composed of a plurality of thin radial blades fixed to a rotor hub structure 54 in such fashion as to provide a space between the trailing edge of one blade and the leading edge of a following blade.

As best shown in Fig. 2 of the drawings, each blade 50 includes a butt 56 through which the blade is riveted to the hub structure 54. An edge of each blade butt engages a butt edge of the blade on either side thereof and thereby imparts to the rotor structure a maximum degree of strength and stability. The spacing between adjacent blades is provided by rearwardly off-setting the leading edge 58 of each blade in respect to the butt 56.

Figure 4:
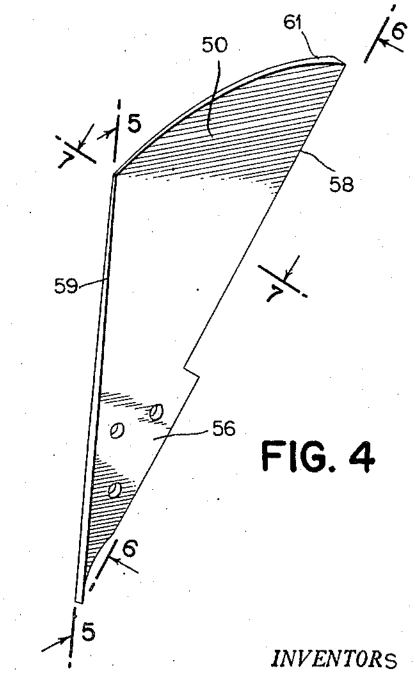
Fig. 4 is a perspective view of one of the rotor vanes.
Figure 5:
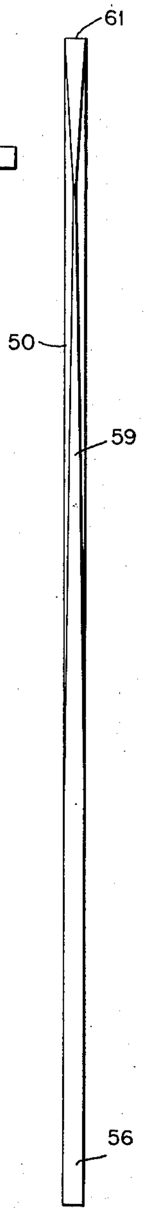
Fig. 5 is an enlarged view along the line 5—5 of the rotor vane shown in Fig. 4.
Figure 6:
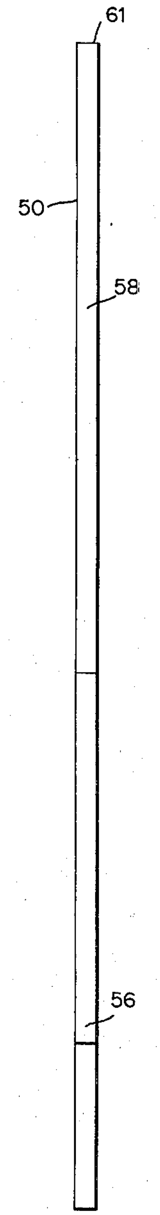
Fig. 6 is an enlarged edge view along line 6—6 of the rotor vane in Fig. 4.
Figure 7:
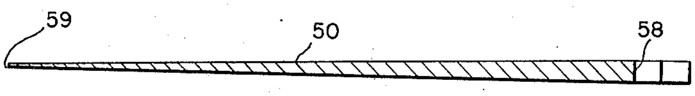
Fig. 7 is an enlarged, sectional view along line 7—7 of the rotor vane in Fig. 4.

In the structure herein illustrated eight blades are mounted to provide a slot 60 of about 1/16" between adjacent blades. The slots are preferably at an angle of about 30° to the radius at the root. As best shown in Fig. 4 of the drawings, the leading edge 58 of each blade has substantial thickness which tapers to a substantially smaller dimension at the trailing edge of the blade. The leading edge is preferably in the neighborhood of .030" in thickness and tapers to about .010" at the trailing corner.

The rotor in Fig. 2 is composed of blades having outer ends 61 which are concentric to the rotor axis, thereby forming a constant clearance 63 between the outer ends of the blades and the enclosing wall of the casing 16.

Figure 8:
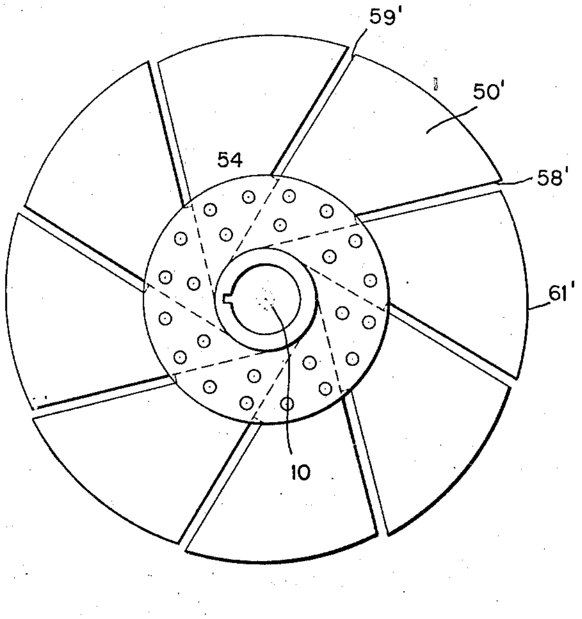
Fig. 8 shows a rotor of modified structure.

In the modified rotor of Fig. 8, the blades 50' have the same sectional contours as those described in respect to the blade shown in Fig. 4. In Fig. 8, however, the outer ends 61' of the blades are eccentric to the rotor axis, thus providing blades wherein the trailing portion 59' at the outer end thereof has a shorter radius than the leading edge 58'. This produces the spaced relationship of rotor to casing, as shown diagrammatically in Fig. 10 of the drawings, wherein the gap between the end of each blade 50' and the adjacent casing wall 16 increases progressively from the leading blade edge 58' to the trailing blade edge 59'.

The clutch housing 11 is mounted for free rotation on the shaft 10 by means of a set of ball bearings 61 and 62. The bearing 61 is sealed by means for a sealing ring 64 which is pressed into sealing engagement by means of a spring 66 which abuts against a collar 68 held in position by a washer 70 seated in a shaft groove 72. The bearing 62 is sealed by means of a resilient sealing ring 74. The space between the bearing seals 64 and 74, including the rotor slot 29, is filled with fine iron powder 75.

Figure 9:
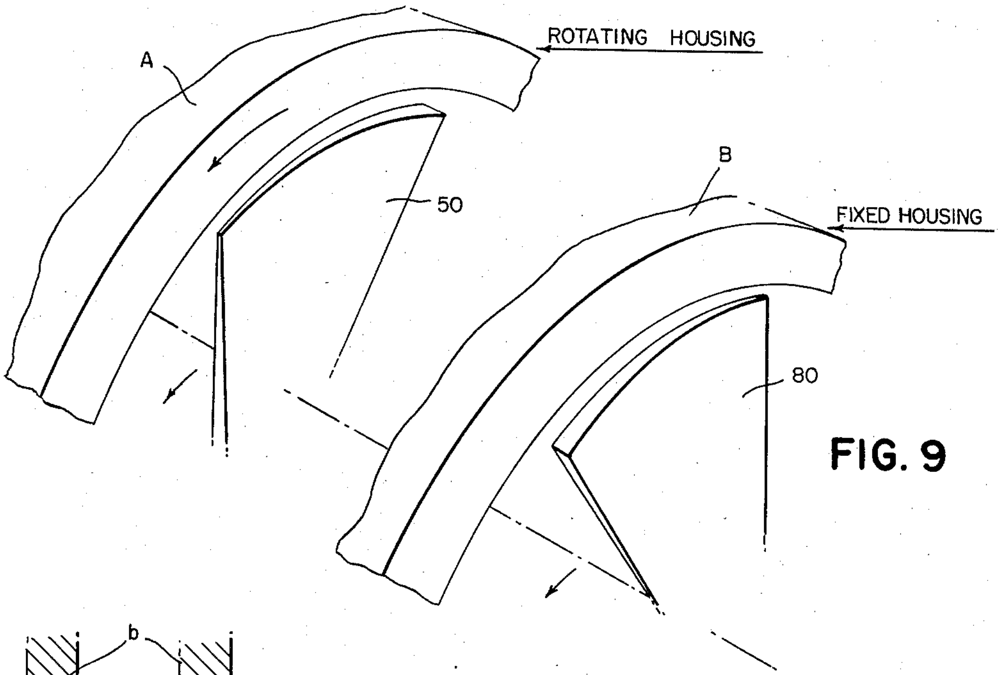
Fig. 9 is a diagrammatic view showing the relationship of the rotors in respect to their housings in a clutch and brake combination such as that shown in Fig. 1.

The braking clutch B is in all respects similar to the driving clutch A with the exception that the casing 76 thereof is fixed against rotation by attaching it to a supporting base 77 by the use of screws 78 which extend through the base and into the wall of the casing, and with the further exception that the rotor blades 80, which may be the same as blades 50 or 50', are reversed, i. e. whereas the blades 50 in the driving clutch A have their wide or leading edges 58 disposed in one direction, the vanes in the braking clutch B have their wide or leading edges disposed in the opposite direction as diagrammatically shown in Fig. 9 of the drawings. Since the braking clutch casing 76 does not rotate, the coils 82 and 84 of the braking clutch B are stationary. It is, therefore, a simple matter to provide energizing leads for the coils through the casing wall in lieu of resort to the commutator ring and brush assembly required for the rotating driving clutch A.

When the coils 37—39 or 82—84 are energized, the iron powder surrounding the respective rotor blades will be magnetized, thereby freezing the rotors against relative movement in respect to their casings.

The clutch casing A has a groove 86 in its periphery adapted to receive a drive belt 88 by means of which the clutch housing 11 is constantly driven. So long as the coils 37 and 39 are deenergized, the clutch shell will rotate freely upon the shaft 10. During such periods of rotation, there is a certain amount of drag between the rotating clutch shell and the stationary rotor 48 due to the iron powder particles with which the clutch is filled. When a pair of reversely rotated clutch shells are mounted on the same shaft, the amount of drag generated within the deenergized one of such clutches is multiplied whenever the other clutch is energized and driven in the opposite direction.

Whenever the coils 37 and 39 of the driving clutch A are energized, the free rotation of the rotor in the braking clutch B will give rise to drag, whereas the same condition will exist in the driving clutch A when the coils 82 and 84 of the braking clutch B are energized and the housing 11 of the driving clutch A is driven relative to its rotor 48. It is to the elimination of drag conditions within the clutches that the principal aspects of this invention are directed.

Figure 10:
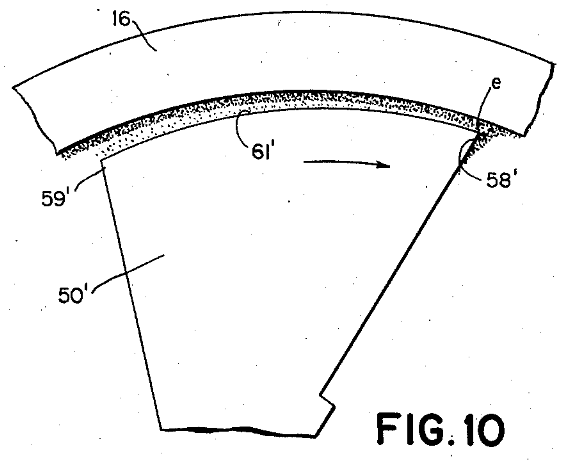
Fig. 10 is a diagrammatic view showing the action of a rotor blade upon iron powder disposed between the distal end of the blade and a surrounding housing wall.

Fig. 11 of the drawings shows in diagrammatic form a rotor blade *a* operating in a slot defined by walls *b*. The blade *a* is represented as one of uniform cross-section, and the figure illustrates the manner in which the iron powder particles *c* are packed with substantially uniform density between the wide faces of the rotor *a* and the slot defining walls *b*. This condition is at its worst when the rotor *a* is in the form of a concentric disc having a cross-section of uniform thickness. The packing of the iron particles 75 has herein been relieved by the use of a rotor made up of spaced blades providing between each adjacent blade the slot 60, by tapering each blade toward its trailing edge, and by forming the outer end of each blade on arcs of decreasing radii, whereby the space between the end of each blade and the defining wall of the casing constitutes a throat which gradually widens toward the trailing edge of the blade as shown in Fig. 10 of the drawings. Each of these expedients is individually effected to reduce drag to a considerable extent, and when combined into a single structure they produce a rotor having a minimum amount of drag.

When a tapered blade as herein disclosed is employed, the action of the blade on the iron particles within the rotor cavity 29 is somewhat as shown diagrammatically in Fig. 12 of the drawings, wherein it will be seen that a relatively dense area of iron particles is formed only at the leading edge of the rotor blade as it rotates freely in the clutch casing rotor cavity. This area is indicated in Fig. 12 in respect to two blades, and constitutes a somewhat dense iron particle zone *d* in front of the first blade and a second similar zone *d'* in front of the second blade. The taper of the blades from front to back provides an increasingly wider space between the faces of the blade and the walls of the rotor slot, thereby affording an opportunity for the dispersion of the iron particles. This effect is enhanced by the slots 60 separating adjacent blades in that particles of the iron powder may lodge in these slots without substantial interference with the free relative rotation between rotor and casing.

A somewhat similar dispersion of iron particles takes place along the outer ends 61' of the blades 50' that are formed eccentric to the rotor axis as shown in Fig. 10 of the drawings. In Fig. 10 a more or less dense area *e* of iron powder accumulates at the leading corner 58' of the blade, but this powder is permitted to expand into a less dense mass in the widening channel between the end 61' of the blade and the housing wall 16.

The substantially free-running rotor-casing relationship in combination with the magnetic core permitting instantaneous high rise of current in the coil effectively produces a clutch structure having extremely high acceleration and deceleration characteristics. When the coils 37 and 39 are energized with the coils 82 and 84 at the same time deenergized, the magnetized iron powder in the clutch A will effectively couple the rotor 48 and the rotating clutch shell 11. Under these conditions the shaft 10 will be driven to impart drive to a capstan 83 affixed to the end of the shaft 10. During such rotation the rotor in the brake clutch B will rotate therein relative to its fixed housing. Fig. 9 of the drawings assumes that the casing 11 of the drive clutch A is being driven in a counterclockwise direction and that the coils 37—39 are energized. This results in rotation of the shaft 10 and the drive of the brake clutch rotor in the same direction in relation to the fixed housing of the brake clutch B. Since the rotor blades 50 of the drive clutch A and the rotor blades 80 of the brake clutch B are reversely positioned in respect to each other, the broad or leading edge of the rotor blades 80 in the brake clutch B are driven against the iron powder within the brake clutch rotor slot, but the resistance is negligible due to the form of the rotor and elements as hereinabove described.

When the coils 37 and 39 of the drive clutch A are deenergized, energization of the brake clutch coils 82 and 84 will operate to effectively couple the brake clutch rotor with the fixed brake clutch housing B. This will substantially instantaneously stop rotation of the shaft 10 and at such time the rotor 50 of the drive clutch A will be held stationary while its casing will continue to rotate. Under such conditions the relatively broad leading edge of the rotor blades in the drive clutch A will encounter the demagnetized iron particles in the rotor slot causing a relatively dense body of iron powder particles only at the upper leading corner of each blade. Thereby the drag of the drive clutch rotor is reduced to a negligible amount. The increased space between the faces of the rotor blades and the walls of the rotor slot results in a more rapid movement of the iron powder particles away from the more restricted rotor-casing clearances and inhibits the excessive accumulation of iron powder in the narrow spaces.

The fact that the slots 60 between the several rotor blades are at an angle of 30° to the radius causes these slots to operate as conveyor devices by means of which iron powder particles are constantly circulated toward the base of the rotor against the existing centrifugal force generated in the one case by the rotating clutch housing and in the other by rotation of the rotor in respect to the fixed housing. This insures that an adequate supply of iron powder particles will be maintained substantially along the entire radial length of the rotor blades, but an even more important function thereof is the constant removal of iron powder particles from the outer portion of the rotor cavity in which there is a tendency for the particles to collect in a dense drag producing body due to centrifugal force.

Since the rotor 50 is a thin disc-like body, it presents a minimum mass but a maximum area on which the iron powder partciles, when magnetized, can operate with a high degree of efficiency. It is seen, therefore, that the objectives of the invention are achieved in an extremely simple and efficient manner by the combination of elements herein disclosed. The form of the respective elements may be changed in various degrees without the sacrifice of operational efficiency, and it is therefore intended that the specific illustration and description of the invention be regarded as illustrative and not as limiting. The scope of the invention is defined in the following claims.

We claim:

1. In a magnetic powder clutch, a clutch casing having a rotor cavity defined by spaced planar side walls and an annular end wall, flux producing means disposed in spaced confronting relationship in each of the side walls of said rotor cavity, a disc-shaped rotor composed of a plurality of radial blades mounted in said casing in spaced relation to said cavity defining walls for relative rotation in said cavity and between said flux producing means, each of said blades having a leading edge and a trailing edge in relation to the direction of relative rotation between said casing and said rotor, the leading edge of each of said blades being of greater thickness than said trailing edge and the lateral blade surfaces tapering from said leading edge to said trailing edge thereby forming a throat of increasing width between the opposite faces of each of said blades and the confronting side wall of said cavity, magnetic particles in said rotor cavity occupying a substantial amount of the space between said rotor and the walls of said cavity, and means for energizing said flux producing means to generate a flux field whereby said magnetic particles are magnetized and said clutch casing and said rotor are thereby connected to rotate in unison.

2. The invention according to claim 1 in which each blade is separated from adjacent blades by a slot opening through the peripheral edge of said rotor and extending inwardly toward the rotor axis throughout at least a substantial portion of the length of said blades.

3. The invention according to claim 1 in which each of said blades has a distal end defined by radii of decreasing length from the leading to the trailing edges thereof.

4. The invention according to claim 2 in which the slots are at an angle of at least 30° to the rotor radius at their roots.

References Cited in the file of this patent

UNITED STATES PATENTS

| | | |
|---|---|---|
| 1,192,233 | Severy | July 25, 1916 |
| 2,601,076 | Winther et al. | June 17, 1952 |
| 2,654,454 | Turkish | Oct. 6, 1953 |
| 2,693,261 | Winther | Nov. 2, 1954 |
| 2,771,170 | Badin | Nov. 20, 1956 |

FOREIGN PATENTS

| | | |
|---|---|---|
| 504,039 | Belgium | Dec. 17, 1951 |

OTHER REFERENCES

Product Engineering, April 1951, pages 114–116.